(12) United States Patent
Mancini et al.

(10) Patent No.: US 11,752,715 B2
(45) Date of Patent: Sep. 12, 2023

(54) METHOD AND PLANT FOR BUILDING TYRES

(71) Applicant: Pirelli Tyre S.p.A., Milan (IT)

(72) Inventors: Gianni Mancini, Milan (IT); Riccardo Antoj, Milan (IT); Vincenzo Boffa, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 401 days.

(21) Appl. No.: 16/448,791

(22) Filed: Jun. 21, 2019

(65) Prior Publication Data

US 2019/0308380 A1 Oct. 10, 2019

Related U.S. Application Data

(62) Division of application No. 14/651,078, filed as application No. PCT/IB2013/061128 on Dec. 19, 2013, now Pat. No. 10,369,757.

(Continued)

(30) Foreign Application Priority Data

Dec. 20, 2012 (IT) .......................... MI2012A002194

(51) Int. Cl.
*B29D 30/00* (2006.01)
*B29D 30/08* (2006.01)
*B29D 30/06* (2006.01)

(52) U.S. Cl.
CPC ............. *B29D 30/00* (2013.01); *B29D 30/06* (2013.01); *B29D 30/0601* (2013.01);
(Continued)

(58) Field of Classification Search
CPC .... B29D 2030/0066; B29D 2030/0663; B29D 30/0061; B29D 30/0662; B29D 30/0601
See application file for complete search history.

(56) References Cited

U.S. PATENT DOCUMENTS

| | | |
|---|---|---|
| 3,891,494 A | 6/1975 | Hunter |
| 4,095,374 A | 6/1978 | Ugo |

(Continued)

FOREIGN PATENT DOCUMENTS

| | | |
|---|---|---|
| EP | 447273 A2 | 9/1991 |
| EP | 1 247 639 | 10/2002 |

(Continued)

OTHER PUBLICATIONS

International Search Report form the European Patent Office for International Application No. PCT/IB2013/061128, dated Jun. 3, 2014.

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A plant (2) for building tyres comprises a system for managing initial components (3); a system for managing the manufacturing of semi-finished products (4) starting from one or more initial components; a system for managing the building of a green tyre (5) starting from one or more semi-finished products; a system for managing the curing of said green tyre (6). The logical set of a control unit (8) for the plant (2) and/or of one or more from among control units (8a-8e) for the management systems (3-6) and/or of a automatic visual control system (7) is programmed for controlling at least two parameters, assigning to each of these a quality index (I), discarding a tyre being processed when a quality index (I) corresponding to said discard level (5) is assigned to at least one of said parameters and feedbacking the control result of at least one parameter in order to verify the quality index (I) of the parameters.

13 Claims, 7 Drawing Sheets

Related U.S. Application Data

Figure 2:
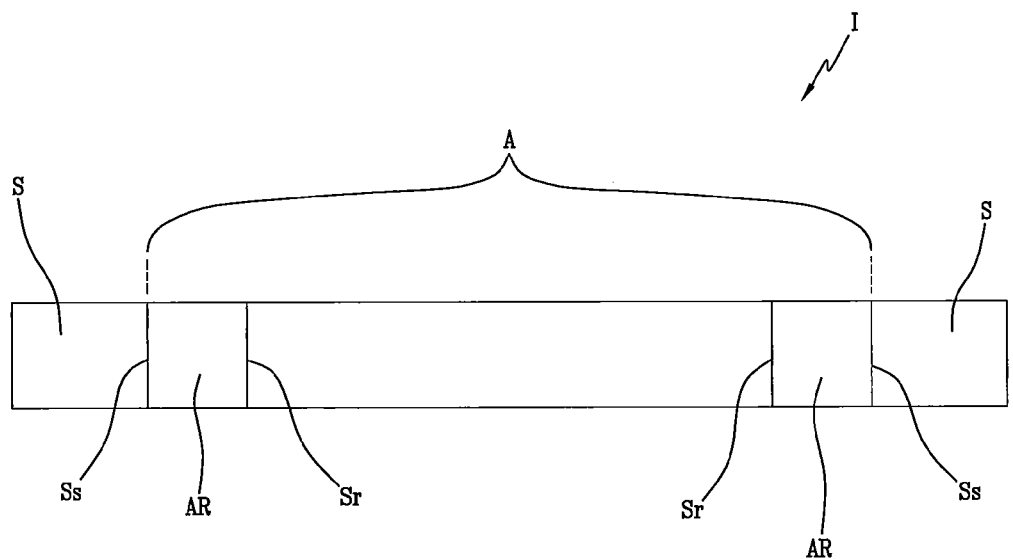

(60) Provisional application No. 61/762,032, filed on Feb. 7, 2013.

(52) U.S. Cl.
CPC ...... *B29D 30/08* (2013.01); *B29D 2030/0066* (2013.01); *B29D 2030/0635* (2013.01); *B29D 2030/0665* (2013.01); *B29D 2030/0675* (2013.01)

(56) References Cited

U.S. PATENT DOCUMENTS

| | | | |
|---|---|---|---|
| 5,645,465 | A | 7/1997 | Vannan, III et al. |
| 6,124,925 | A | 9/2000 | Kaneko |
| 6,173,892 | B1 * | 1/2001 | Kimijima ........... B29D 30/0061 235/385 |
| 2002/0177964 | A1 | 11/2002 | Shteinhauz |
| 2003/0033040 | A1 | 2/2003 | Billings |
| 2003/0149542 | A1 | 8/2003 | Chang |
| 2003/0189266 | A1 * | 10/2003 | Cole ................ B29D 30/0645 264/40.1 |
| 2004/0011454 | A1 * | 1/2004 | Mancini ............ B29D 30/3007 156/130 |
| 2005/0126684 | A1 | 6/2005 | Sieverding |
| 2007/0137763 | A1 | 6/2007 | Burg et al. |
| 2009/0171494 | A1 | 7/2009 | Wachter |
| 2012/0092149 | A1 * | 4/2012 | Fujisawa ............. G01B 11/245 340/442 |
| 2012/0267031 | A1 | 10/2012 | Mawby et al. |
| 2013/0078058 | A1 | 3/2013 | Marchini et al. |
| 2013/0253686 | A1 * | 9/2013 | Flament ................ G01B 21/20 700/117 |

FOREIGN PATENT DOCUMENTS

| | | |
|---|---|---|
| JP | 2004-354258 | 12/2004 |
| JP | 2012-051297 A * | 3/2012 |
| WO | WO 2010/126516 | 11/2010 |
| WO | WO 2011/148283 | 12/2011 |
| WO | WO 2012/085632 A1 | 6/2012 |

OTHER PUBLICATIONS

Written Opinion of the International Searching Authority from the European Patent Office for International Application PCT/IB2013/061128, dated Jun. 3, 2014.

Notice of Reasons for Rejection from the Japanese Patent Office, in counterpart Japanese Patent Application No. 2015-548852 dated Nov. 13, 2015.

Decision of Rejection with English language translation mailed by Japanese Patent Office dated Jun. 28, 2016 in counterpart Japanese Application No. 2015-548852.

Notice of Reasons for Rejection dated Oct. 12, 2017, from the Japanese Patent Office in counterpart Japanese Patent Application No. 2016-211943.

Notice of Reasons for Rejection dated Sep. 26, 2017, from the Japanese Patent Office in counterpart Japanese Patent Application No. 2015-548852.

Decision to Grant, dated Dec. 19, 2017, from the Russian Service for Intellectual Property in counterpart Russian Application No. 2015128267/043846.

Machine translation of JP-2004-354258-A, patent document published Dec. 16, 2014.

Hahn, J. and Edgar, T.F., Oct. 2003, "Process Control" in Kirk-Othmer Encyclopedia of Chemical Technology, pp. 1-48.

* cited by examiner

| | ESEMPIO 1 | ESEMPIO 2 | ESEMPIO 3 | ESEMPIO 4 | ESEMPIO 5 | ESEMPIO 6 | ESEMPIO 7 |
|---|---|---|---|---|---|---|---|
| COMPONENTI DI PARTENZA | A | AR | A | A | AR | AR | AR |
| FASI SEMILAV. | A | A | A | A | A | A | A |
| SEMILAV. | AR | AR | A | A | A | AR | S |
| FASI CONFEZION. PNEUMATICO CRUDO | A | A | A | A | A | A | |
| PNEUMATICO CRUDO | A | AR | A | A | A | S | |
| VULCANIZZ. | A | A | AR | AR | A | | |
| PNEUMATICO STAMPATO E VULCANIZZATO | S | S | S | AR | A | | |

FIG. 1

METHOD AND PLANT FOR BUILDING TYRES

This is a division of application Ser. No. 14/651,078, filed Jun. 10, 2015, which is a 371 national stage entry application based on PCT/I62013/061128, filed Dec. 19, 2013, claims the priority of Italian Patent Application No. MI2012A002194, dated Dec. 20, 2012, and claims the benefit of U.S. Provisional Application No. 61/762,032, filed Feb. 7, 2013; the content of each application is incorporated herein by reference.

The present invention relates to a method and a plant for building tyres.

The production cycles of a tyre provide for manufacturing and/or assembling the various components of a tyre being processed in one or more building lines and subsequently subjecting the tyre being processed to a process of moulding and curing adapted to define the structure of the tyre according to a desired geometry and tread design.

For the manufacturing of the components of the tyre, initial components are predisposed from which semi-finished products are obtained.

Subsequently, a green tyre is built starting from one or more semi-finished products, it is moulded and cured.

The moulded and cured tyre is subjected to a manual visual inspection, after which it can be discarded or catalogued as acceptable and hence intended for the market (for the original equipment or for "replacement/spare" equipment).

Possible modifications of the production process for correcting the defects are entrusted to the experience of the operator, who checks the discard, being based on the type and measure of the tyre.

With the term "initial components" it is intended one or more from among elastomeric materials and cords comprising at least one textile or metallic thread. The set of multiple threads preferably has the threads twisted together.

With the term "elastomeric material" it is intended to indicate a composition comprising at least one elastomeric polymer and at least one reinforcement filler. Preferably, such composition further comprises additives such as, for example, a cross-linking agent and/or a plasticising agent. Due to the presence of the cross-linking agent, such material can be cross-linked by heating, so as to form the final manufactured product.

With the term "green tyre" it is indicated a tyre obtained at the end of the building process and not yet moulded and cured.

With the term "tyre being processed" it is intended the set of one or more parts of the green tyre built on a forming support, including the initial components, the green tyre and the moulded and cured tyre to be subjected to control.

With the term "semi-finished product" it is intended a semi-finished product of conventional type, single piece or cut to size, for example a liner, under-liner, anti-abrasive element, complex (the liner, under-liner and anti-abrasive element set), bead core, bead core filler, reinforcement insert, sidewall insert, sidewall, carcass ply, belt layer, under-layer, tread band, etc., or an "elementary" semi-finished product i.e. in the form of at least one of the following: a continuous elongated element made of elastomeric material; a textile or metallic reinforcement cord, preferably covered with elastomeric material; a belt-like element made of elastomeric material comprising at least two textile or metallic cords. The latter, when cut to size, is also termed "strip-like element".

With the term "parameter" it is intended a characteristic that can affect the quality of the tyre. The parameter is associated with one or more from among: initial components, steps for manufacturing the semi-finished products, semi-finished products, steps for building the green tyre, green tyre, curing, moulded and cured tyre. By way of example, in the case of elastomeric materials, one parameter is for example constituted by the relative expiry date. In the case of the semi-finished products and/or of the green tyre and/or of the moulded and cured tyre, one parameter is for example constituted by the concentration and/or size of air bubbles.

With the term "quality index" it is intended a numeric code, alphanumeric code or visual code assigned to a parameter indicating the level (e.g. acceptable, of discard, acceptable with reserve) in which the following was entered: relative initial component, step of manufacturing the semi-finished product, semi-finished product, step of building of the green tyre, green tyre, curing, moulded and cured tyre.

With the term "control operating as a function of the quality indices" it is intended a control performed in order to verify the effect of possible quality indices corresponding to different levels. Preferably corresponding to acceptable levels with reserve.

With the term "automatic visual control" it is intended a system for the automatic inspection of the moulded and cured tyre.

With the term "control unit" it is intended the logical set of one or more of the control units provided in the plant.

The Applicant has observed that the inspections carried out up to now start from the assumption that initial components, semi-finished products, machinery and processes actuated have been generated or are operating within the pre-established tolerances.

The Applicant has observed that such assumption is the cause of a high number of discards at the end of the production process, i.e. after having concluded all the steps to which the tyre is subjected, and hence with a high final discard cost.

The Applicant has also observed that the introduction of a more accurate inspection for improving the quality of the finished product would risk increasing the tyre production times and would not quicken the return of the information to the production cycle.

The Applicant has perceived that by selecting specific parameters and assigning a quality index structured in at least three levels thereto, of which at least two correspond to two levels of acceptability, it is possible to prevent the abovementioned drawbacks.

More precisely, the Applicant has found that the immediate feedback and/or feedback at the end of an automatic visual control based on the aforesaid quality index allows improving the quality of the finished product and decreasing the discards during the entire process, in particular at the finished product level where the discard is even more burdensome.

More precisely, in accordance with a first aspect, the invention relates to a method for building tyres comprising predisposing initial components.

Preferably it is provided to manufacture semi-finished products starting from one or more initial components.

Preferably it is provided to build a green tyre starting from one or more semi-finished products.

Preferably it is provided to mould and cure said green tyre.

Preferably it is provided to detect at least two parameters relative to a tyre being processed, said parameters being associated with one or more from among: initial components, steps for manufacturing the semi-finished products, semi-finished products, steps for building the green tyre, green tyre, curing, moulded and cured tyre.

Preferably it is provided to control each of said at least two parameters in order to assign to each of them a quality index comparing each parameter with at least one discard threshold and at least one reserve threshold, wherein said at least one discard threshold separates a discard level from an acceptable level of said quality index and wherein said at least one reserve threshold corresponds to the acceptable level of said quality index and defines one or more acceptable levels with reserve proximal to the discard threshold.

Preferably it is provided to discard said tyre being processed when a quality index corresponding to said discard level is assigned to at least one of said parameters.

Preferably it is provided to feedback the control result of at least one parameter in order to verify the quality index of said at least two parameters.

The Applicant deems that the aforesaid solution allows improving the quality of the finished product and decreasing the discards for any type of tyre building plant, independent of the semi-finished products employed and produced, of the flexibility of the plants themselves and of the requested productivity levels.

In accordance with a second aspect the invention relates to a plant for building tyres comprising a system for managing initial components.

Preferably the plant comprises a system for managing the manufacturing of semi-finished products starting from one or more initial components.

Preferably the plant comprises a system for managing the building of a green tyre starting from one or more semi-finished products.

Preferably the plant comprises a system for managing the curing of said green tyre.

Preferably the plant comprises a control unit programmed for:
  controlling at least two parameters relative to a tyre being processed, said parameters being associated with one or more from among: initial components, steps for manufacturing the semi-finished products, semi-finished products, steps for building the green tyre, green tyre, curing, moulded and cured tyre, for assigning to each of said at least two parameters a quality index comparing each parameter with at least one discard threshold and at least one reserve threshold, wherein said at least one discard threshold separates a discard level from an acceptable level of said quality index and wherein said at least one reserve threshold corresponds to the acceptable level of said quality index and defines one or more acceptable levels with reserve proximal to the discard threshold.

Still more preferably the plant comprises a control unit programmed for:
  feedbacking the control result of at least one parameter in order to verify the quality index of said at least two parameters.

The present invention in at least one of the aforesaid aspects can have at least one of the following preferred characteristics.

Preferably said at least two parameters comprise at least one initial parameter and one further parameter.

Preferably controlling each of said at least two parameters comprises controlling said initial parameter assigning a relative quality index thereto, and controlling said further parameter considering the quality index assigned to said initial parameter, assigning to said further parameter a relative quality index.

Preferably controlling each of said at least two parameters comprises controlling said initial parameter assigning a relative quality index thereto, the selection of the further parameter to be detected being operated as a function of the quality index assigned to said initial parameter.

Preferably feedbacking the control result of at least one parameter comprises feedbacking the control result at least of said further parameter in order to verify the quality index of said at least one initial parameter and further parameter.

The Applicant deems that setting the selection and/or the controlling of the further parameter on the basis of the quality indices of the initial parameter allows optimizing the quality and the cycle time of the control, since the possible existence of causes that could generate defects and thus possible discards is known beforehand. In addition, it is possible to quicken the feedback.

Preferably at least one of said at least two parameters is modified by said feedback so as to be assigned a quality index corresponding to said acceptable level at the subsequent control.

Preferably it is provided to subject said moulded and cured tyre to an automatic visual control.

The Applicant deems that the use of an automatic visual control allows improving the quality of the finished product and decreasing the discards.

Preferably it is provided to feedback the results of the automatic visual control relative to at least one of said at least two parameters in order to verify the quality index of said at least two parameters.

The Applicant deems that setting the automatic visual control on the basis of the quality indices allows having a forecast and/or a subdivision of the product in terms of quality, optimizing the cycle time of the automatic visual control system since the possible existence of causes that could generate defects and thus possible discards is known beforehand; this quickens the feedback in all levels of the process, in particular between the automatic visual control and the preceding steps.

Preferably said automatic visual control operates as a function of at least the quality index assigned to at least one of said at least two parameters.

Preferably it is provided to subject said moulded and cured tyre to at least one instrumental control.

Preferably it is provided to subject said moulded and cured tyre to at least one manual visual control.

Preferably it is provided to detect and control a parameter associated with an initial component, and discard the initial component whose parameter was assigned with a quality index corresponding to the discard level prior to manufacturing semi-finished products.

Preferably it is provided to detect and control a parameter associated with an initial component, and discard the initial component whose parameter was assigned with a quality index corresponding to the discard level prior to building the green tyre.

Preferably it is provided to detect and control a parameter associated with a semi-finished product or with a manufacturing step thereof, and discard the semi-finished product whose parameter was assigned with a quality index corresponding to the discard level prior to building the green tyre.

Preferably it is provided to detect and control a parameter associated with a green tyre or with a building step thereof, and discard the built green tyre whose parameter was assigned with a quality index corresponding to the discard level prior to the curing.

Preferably detecting at least one of said at least two parameters comprises reading at least one of said at least two parameters by means of detecting devices.

Preferably detecting at least one of said at least two parameters comprises entering at least one of said at least two parameters.

Preferably detecting at least one of said at least two parameters comprises entering at least one of said at least two parameters into a control unit.

Preferably detecting at least one of said at least two parameters comprises entering at least one of said at least two parameters into a control unit of a system for managing the relative initial component(s), steps for manufacturing the semi-finished products, steps for building the green tyre, curing to which said at least one parameter is associated.

Preferably detecting at least one of said at least two parameters comprises entering at least one of said at least two parameters into a control unit for an automatic visual control operating on the moulded and cured tyre.

Preferably said control of at least one of said at least two parameters is carried out at a control unit level.

Preferably said control of at least one of said at least two parameters is carried out at a control unit level of a system for managing the relative: initial components, steps for manufacturing the semi-finished products, steps for building the green tyre, curing, when at least one of said at least two parameters is associated thereto.

Preferably said control of at least one of said at least two parameters is carried out at a control unit level of an automatic visual control operating on the moulded and cured tyre.

Preferably it is provided to send to a control unit at least one initial parameter of said at least two parameters or the quality index of at least one initial parameter of said at least two parameters.

Preferably said at least one initial parameter or said quality index of at least one initial parameter comes from a system for managing the relative initial component(s), steps for manufacturing the semi-finished product, steps for building the green tyre, curing to which said at least one initial parameter is associated.

Preferably said control unit carries out the control or receives the control results of at least one further parameter of said at least two parameters with assigning of the relative quality index and sends—to the system for managing the initial component(s), steps for manufacturing the semi-finished product, steps for building the green tyre, curing to which said at least one initial parameter is associated—instructions for modifying the quality index of said at least one initial parameter as a function of the quality index of said further parameter.

Preferably said further parameter is associated with the moulded and cured tyre or with the green tyre prior to the curing.

Preferably said control unit is a control unit for one or more from among:

a system for managing the initial component(s),
a system for managing the steps for manufacturing the semi-finished product,
a system for managing the steps for building the green tyre,
a system for managing the curing.

Preferably it is provided to send to a control unit for an automatic visual control operating on the moulded and cured tyre at least one initial parameter of said at least two parameters or the quality index of at least one initial parameter of said at least two parameters.

Preferably said at least one initial parameter or said quality index of said at least one initial parameter comes from system for managing the relative initial component(s), steps for manufacturing the semi-finished product, steps for building the green tyre, curing to which said at least one initial parameter is associated.

Preferably said control unit for the automatic visual control carries out the control or receives the control results of at least one further parameter of said at least two parameters and sends—to the system for managing the initial component(s), steps for manufacturing the semi-finished product, steps for building the green tyre, curing to which said at least one initial parameter is associated—instructions for modifying the quality index of said at least one initial parameter as a function of the quality index of said further parameter.

Preferably said further parameter is associated with the moulded and cured tyre or with the green tyre prior to the curing.

Preferably said quality index comprises at least three levels, respectively of discard, acceptable and acceptable with reserve.

Preferably said quality index comprises at least one upper discard level separated from said acceptable level by means of an upper discard threshold.

Preferably said quality index comprises at least one lower discard level separated from said acceptable level by means of a lower discard threshold.

Preferably said acceptable level is disposed centrally with respect to a lower discard threshold and to an upper discard threshold.

Preferably said quality index comprises at least one upper acceptable level with reserve proximal to an upper discard threshold and defined within the acceptable level by means of an upper reserve threshold.

Preferably said quality index comprises at least one lower acceptable level with reserve proximal to a lower discard threshold and defined within the acceptable level by means of a lower reserve threshold.

Preferably said acceptable level is disposed centrally with respect to a lower discard threshold and an upper discard threshold and comprises a lower acceptable level with reserve and an upper acceptable level with reserve not adjacent.

Preferably said quality index comprises at least two acceptable levels with reserve adjacent with respect to each other.

Preferably said control unit is programmed for controlling each of said at least two parameters comprising at least one initial parameter and one further parameter.

Preferably said control unit is programmed for controlling said further parameter considering the quality index assigned to said initial parameter, and for feedbacking the control result at least of said further parameter in order to verify the quality index of said at least one initial parameter and one further parameter.

Preferably said control unit is programmed for controlling said initial parameter assigning a relative quality index thereto, the selection of the further parameter to be detected being operated as a function of the quality index assigned to said initial parameter, and for feedbacking the control result at least of said further parameter in order to verify the quality index of said at least one initial parameter and further parameter.

Preferably at least one automatic visual control system is provided, operating on said moulded and cured tyre.

Preferably said control unit is programmed for feedbacking the results of the automatic visual control relative to at least one of said at least two parameters in order to verify the quality index of said at least two parameters.

Preferably said automatic visual control system operating on said moulded and cured tyre operates as a function at least of a quality index assigned to at least one of said at least two parameters.

Preferably said control unit comprises a control unit for the automatic visual control system.

Preferably said control unit comprises a control unit for controlling one or more of said management systems.

Preferably said control unit is programmed for receiving at least one parameter from one or more of said management systems.

Preferably at least one instrumental control system is provided.

Preferably a manual visual control system is provided.

Preferably a discard line is provided for discarding the initial component whose parameter was assigned with a quality index corresponding to the discard level.

Preferably a discard line is provided for discarding the semi-finished product whose parameter was assigned with a quality index corresponding to the discard level.

Preferably a discard line is provided for discarding the built green tyre whose parameter was assigned with a quality index corresponding to the discard level.

Preferably a discard line is provided for discarding the moulded and cured tyre whose parameter was assigned with a quality index corresponding to the discard level.

Preferably detecting devices are provided for detecting at least one of said at least two selected parameters.

Preferably interface devices are provided for entering at least one of said at least two parameters.

Preferably said management systems comprise interface devices for entering at least one of said at least two parameters.

Preferably said control unit comprises interface devices for entering at least one of said at least two parameters.

Preferably a communication network is provided, interconnected between said management systems and said control unit.

Figure 6:
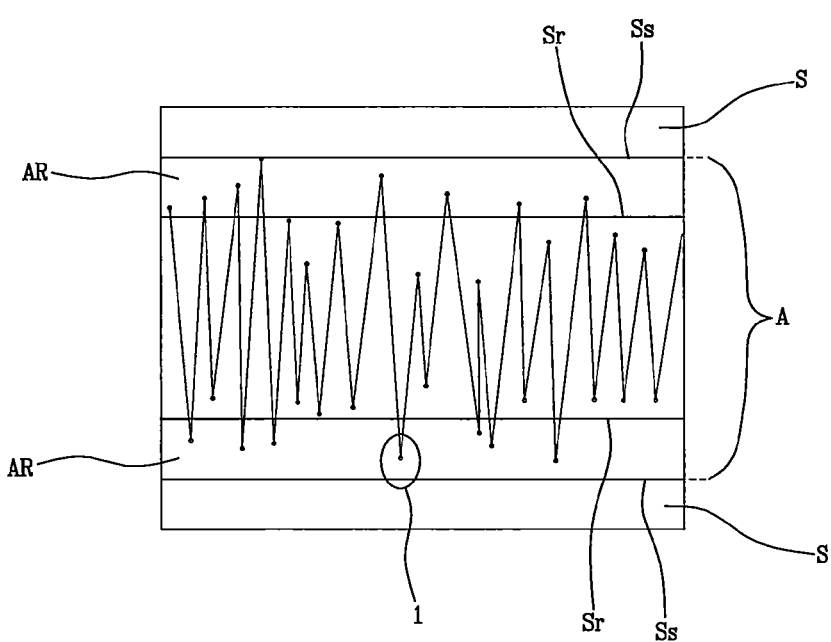
Figure 7:
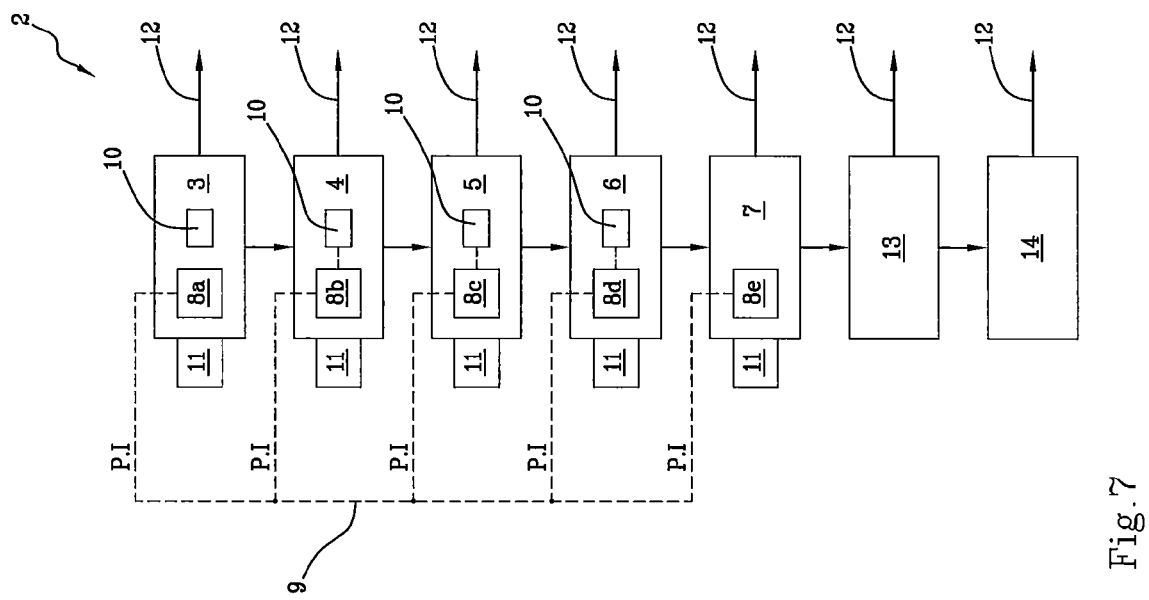
Figure 8:
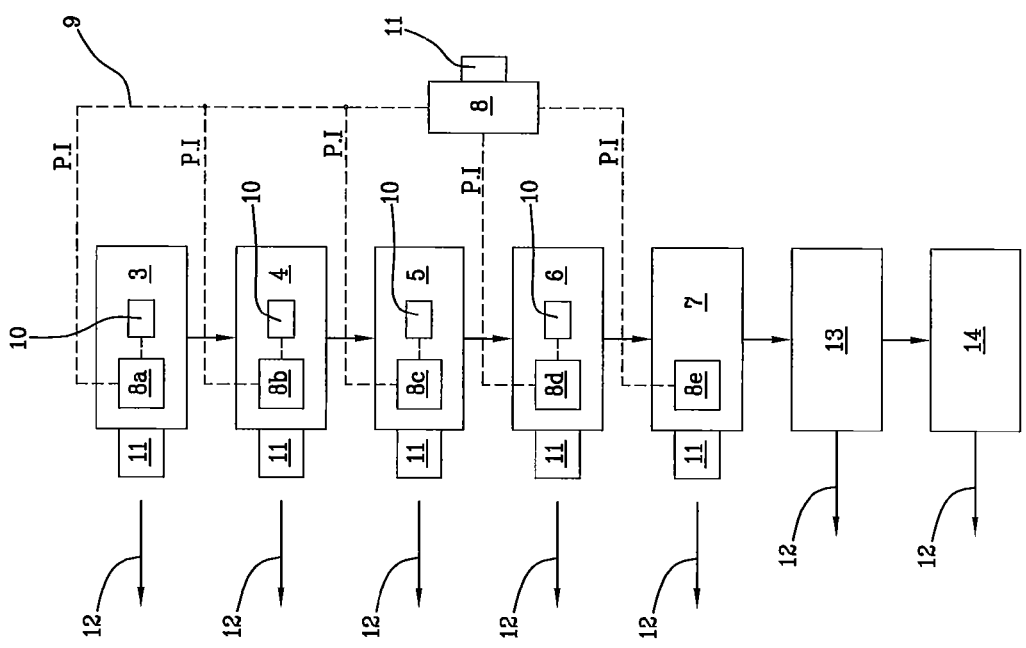

Further characteristics and advantages of the invention will be clearer from the following description of several examples of methods and plants for building tyres according to the invention, made as a non-limiting example with reference to the enclosed figures in which:

FIG. 1 illustrates a scheme of several examples of a method for building tyres according to the present invention;

FIGS. 2-5 schematically illustrate respective examples of a quality index used in a method according to the present invention;

FIG. 6 schematically illustrates a diagram bearing readings of a parameter used in a method according to the present invention and the relative quality index;

FIG. 7 schematically illustrates a possible embodiment of a plant for building tyres according to the present invention;

FIG. 8 schematically illustrates a further possible embodiment of a plant for building tyres according to the present invention.

With reference to FIG. 1, seven possible examples of a method for building tyres according to the present invention are schematized. Generally, such method provides for predisposing one or more initial components, manufacturing one or more semi-finished products starting from one or more initial components by means of one or more steps for manufacturing the semi-finished products, building a green tyre starting from one or more semi-finished products by means of one or more steps for building the green tyre and moulding and curing the green tyre.

The method according to the present invention further provides for detecting at least two parameters relative to a tyre being processed. Such parameters can be associated with one or more from among: initial components, steps for manufacturing the semi-finished products, semi-finished products, steps for building the green tyre, green tyre, curing, moulded and cured tyre, reported in the first column of FIG. 1.

Each considered parameter is controlled, assigning a quality index I thereto. In order to assign the quality index I, each parameter is compared with at least one discard threshold Ss and at least one reserve threshold Sr.

Each discard threshold Ss separates a discard level S from an acceptable level A of the quality index I. The reserve threshold Sr corresponds to the acceptable level A of the quality index I (i.e. it is comprised in the acceptable level A) and defines one or more acceptable levels with reserve AR proximal to the discard threshold Ss.

In particular, the quality index comprises at least three levels, respectively of discard S, acceptable A and acceptable with reserve AR. The acceptable level with reserve AR is comprised within the acceptable level A.

Figure 4:
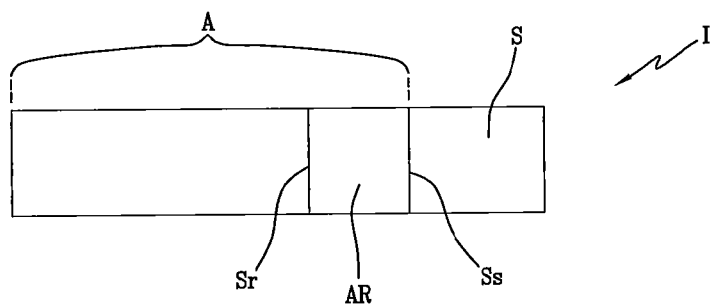

FIG. 4 corresponds to an example of the quality index I depicting a discard threshold Ss, a reserve threshold Sr and three levels, respectively of discard S, acceptable A and acceptable with reserve AR. The left limit of FIG. 4 is not significant in the evaluation of the relative parameter.

The quality index of FIG. 4 is for example applied in the case of the initial components for which the detected parameter can be the date of use. By comparing the date of use with the expiry date that constitutes the discard threshold Ss, it is possible to assign a quality index I to an initial component analogous to the index of FIG. 4 as a function of the vicinity of the expiry date. The reserve threshold Sr (i.e. the period of time in which the component is still acceptable but with reserve since close to expiry) is defined as a function of the initial component type.

The quality index of FIG. 4 is for example applied in the case of the presence of air bubbles in one or more semi-finished products, or in a corresponding manufacturing step, or in the green tyre or in a corresponding building step, or in the moulded and cured tyre. A parameter corresponding to the presence of air bubbles, e.g. given by their concentration and/or by their size, is for example read by means of detecting devices and compared with a discard threshold Ss, assigning a quality index I to the semi-finished product, green tyre, moulded and cured tyre or to a relative manufacturing/building step.

According to a different example, the quality index I comprises at least one upper discard level S separated from the acceptable level A by means of an upper discard threshold Ss. The quality index I can comprise at least one upper acceptable level with reserve AR proximal to an upper discard threshold Ss and defined within the acceptable level A by means of an upper reserve threshold Sr. Alternatively or in addition, the quality index comprises at least one lower discard level S separated from the acceptable level by means of a lower discard threshold Ss. The quality index I can comprise at least one acceptable level with lower reserve AR proximal to a lower discard threshold Ss and defined within the acceptable level A by means of a lower reserve threshold Sr.

One example of a quality index I comprising both an upper discard level S and a lower discard level S is represented in FIG. 2. The acceptable level A is disposed centrally with respect to the lower discard threshold Ss and to the upper discard threshold Ss. Preferably in proximity to each of the discard thresholds Ss, the acceptable level A has a reserve threshold Sr that defines a relative acceptable level with reserve AR. FIG. 2 therefore relates to a quality index I in which the following are illustrated: an upper acceptable level with reserve AR proximal to the upper discard threshold Ss as well as a lower acceptable level with reserve AR proximal to the lower discard threshold Ss. The lower acceptable level with reserve AR and the upper acceptable level with reserve AR are not adjacent.

The example of FIG. 2 corresponds to a quality index I comprising five levels: an acceptable level A, two levels of discard S and, within the acceptable level A, two acceptable levels with reserve AR.

The quality index of FIG. 2 is for example applied in the case of reading the width of the tread band along the semi-finished product itself, the parameter of the width being intended as a numeric value calculated with reference to one of the two edges of the tread band itself.

Figure 3:
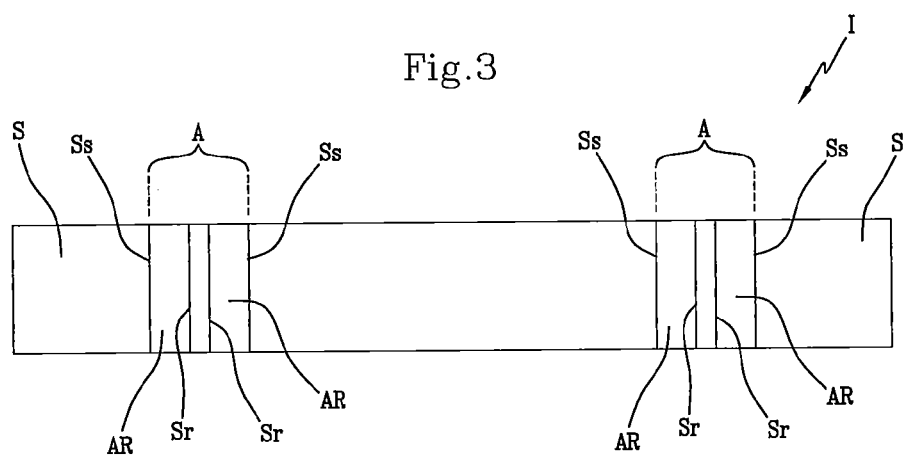

FIG. 3 illustrates a further example of a quality index I corresponding to a duplication of the quality index of FIG. 2. In this case, the quality index I comprises nine levels: two acceptable levels A, two acceptable levels with reserve AR within each acceptable level A and three levels of discard S (an upper discard level, an intermediate discard level and a lower discard level). The quality index I illustrated in FIG. 3 is for example applied in the case of reading the width of the tread band along the semi-finished product itself, the parameter of the width being intended as the distance of each of the two edges of the tread band itself with respect to a central reference.

Figure 5:
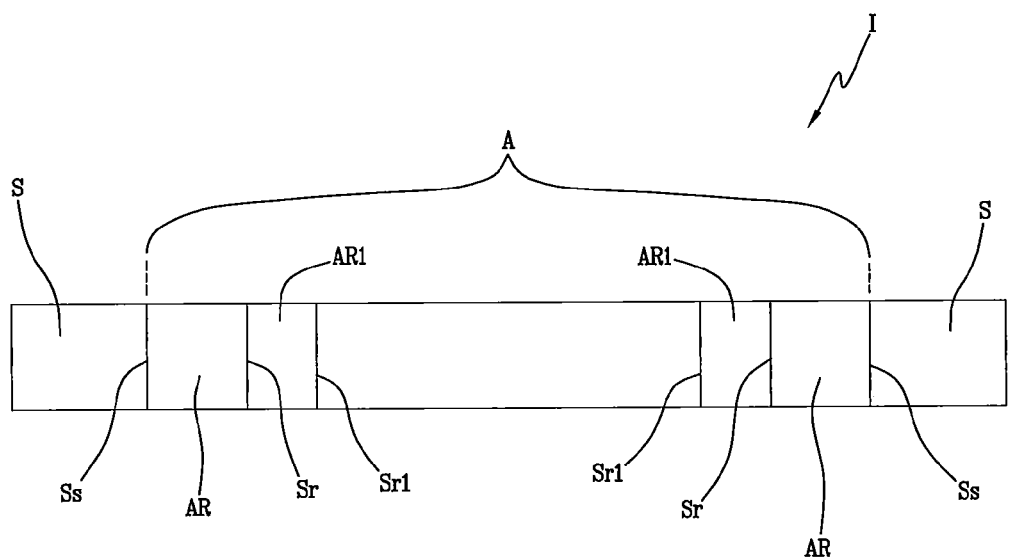

FIG. 5 illustrates a further example of the quality index I comprising two acceptable levels with reserve AR and AR1 adjacent with respect to each other for each discard threshold Ss. In this case, two reserve thresholds Sr and Sr1 are provided for each discard threshold Ss. A first reserve threshold Sr defines a first acceptable level with reserve AR adjacent to the discard level S. A second reserve threshold Sr1 defines a second acceptable level with reserve AR1 adjacent to the first acceptable level with reserve AR and not adjacent to the discard level S.

Once the quality index I is assigned, one can possibly proceed with discarding the tyre being processed when a quality index I corresponding to said discard level S is assigned to at least one of the considered parameters.

The control result of at least one of the parameters is feedbacked in order to verify the quality index I of the at least two considered parameters. In particular at least one of the considered parameters is modified by the feedback so as to be assigned a quality index I corresponding to the acceptable level A at the subsequent control.

Considering any one of the examples schematized in FIG. 1, the method according to the present invention can provide for detecting at least two parameters comprising at least one initial parameter and at least one further parameter. The detection and/or the control of the two parameters is carried out for example, but not necessarily, in time sequence.

It is possible to proceed to the control of the initial parameter, assigning a relative quality index I thereto, and to the control of the further parameter considering the quality index I assigned to the initial parameter. Also the further parameter is assigned a relative quality index I.

Alternatively or in addition, it is possible to proceed with the control of the initial parameter, assigning a relative quality index I thereto. The selection of the further parameter to be detected is operated as a function of the quality index I assigned to the initial parameter. In other words, the further parameter is selected from among those which could be affected by the quality index I assigned to the initial parameter. A relative quality index I following a relative control is also assigned to the further parameter.

At least the control result of the further parameter is feedbacked in order to verify the quality index I of the initial parameter and of the further parameter. In particular, at least one of the considered parameters is modified by the feedback so as to be assigned a quality index I corresponding to the acceptable level A at the subsequent control.

According any one example of the examples schematized in FIG. 1, one can proceed for example to detect and control a parameter associated with an initial component, for example the date of storage with respect to the date of expiry.

In the case in which (not illustrated) a parameter associated with an initial component is assigned a quality index corresponding to the discard level S, one proceeds with discarding such initial component prior to manufacturing the semi-finished products. Such example is in particular applied in the methods which provide for, in a step preceding the building of the green tyre, the manufacturing of a semi-finished product of conventional type, single piece or cut to size, or of a so-called elementary semi-finished product.

In the case in which (not illustrated) a parameter associated with an initial component is assigned a quality index corresponding to the discard level S, one proceeds with discarding such initial component prior to building the green tyre. Such example is applied in particular in the methods that provide for the building of green tyres simultaneously with the manufacturing of semi-finished products, in particular "elementary" semi-finished products.

According to one example, referable to example 7 of FIG. 1, it is provided to detect and control a parameter associated with a semi-finished product, for example the concentration and/or size of air bubbles, and to discard the semi-finished product whose parameter was assigned with a quality index I corresponding to the discard level S prior to building the green tyre. The above-described example can be applied considering, alternatively or additionally, a parameter associated with a step for manufacturing a semi-finished product (in example 7, a parameter associated with the steps for manufacturing the semi-finished product was given a quality index corresponding to the acceptable level A).

In particular according to example 7 of FIG. 1, the method comprises detecting a parameter associated with an initial component, for example the date of use of the elastomeric material for ply rubberising. The quality index I assigned to such parameter corresponds to the acceptable level with reserve AR since the date of use is fund between the discard threshold Ss (expiry date) and the reserve threshold Sr (see for example the quality index illustrated in FIG. 4).

During the manufacturing of a semi-finished product, for example of the rubberized ply in a rolling press, air bubbles are found in the semi-finished product itself. The parameter given by the concentration of air bubbles in the rubberized ply is such to fall within the discard level S since it is greater than a discard threshold Ss (see for example the quality index illustrated in FIG. 4).

Since at least one of the parameters considered was assigned a quality index I corresponding to the discard level, the relative tyre being processed, i.e. the rubberized ply, is discarded.

Preferably the parameter given by the date of use of the elastomeric material for rubberized ply constitutes an initial parameter and the parameter given by the concentration of air bubbles of the rubberized ply constitutes a further parameter, i.e. one or more of the following conditions occur:

the selection of the parameter given by the concentration of air bubbles of the rubberized ply is operated considering the quality index I assigned to the initial parameter. In other words, the parameter given by the concentration of air bubbles of the rubberized ply is selected from among those which could be affected by the fact that the elastomeric material for rubberized ply was assigned an acceptable level with reserve AR of the quality index I;

the control of the parameter given by the concentration of air bubbles of the rubberized ply is operated considering the quality index I assigned to the initial parameter.

The parameter given by the concentration of air bubbles of the rubberized ply is for example read by means of detecting devices. Preferably the detecting devices are associated with a system for managing the steps for manufacturing the semi-finished product, to which the parameter under examination is associated (in this case, a system for managing the steps for manufacturing the rubberized ply).

At least the control result of the parameter given by the concentration of air bubbles of the rubberized ply in a rolling press is feedbacked in order to verify the quality index I of the two considered parameters. In particular at least one of the considered parameters is modified by the feedback so as to be assigned a quality index I corresponding to the acceptable level A at the subsequent control. In the example in question, the feedback of the control result of the parameter given by the concentration of air bubbles of the rubberized ply in a rolling press modifies the quality index I of both parameters.

According to one example, referable to example 6 of FIG. 1, it is provided to detect and control a parameter associated with a green tyre or with a building step thereof, and discard the built green tyre whose parameter was assigned with a quality index I corresponding to the discard level prior to the curing.

In particular according to example 6 of FIG. 1, the method comprises detecting a parameter associated with an initial component, for example the date of use of the elastomeric material for rubberized ply. The quality index I assigned to such parameter corresponds to the acceptable level with reserve AR, since the date of use is found between the discard threshold Ss (expiry date) and the reserve threshold Sr (see for example the quality index illustrated in FIG. 4).

During the manufacturing of a semi-finished product, for example the manufacturing of the rubberized ply in a rolling press, air bubbles are found in the semi-finished product itself. The parameter given by the concentration of air bubbles in the rubberized ply is such to fall within the acceptable level with reserve AR since it is comprised between the discard threshold Ss and the reserve threshold Sr (see for example the quality index illustrated in FIG. 4). Possibly, its selection and/or control can be operated considering the quality index I assigned to the date of use of the elastomeric material for rubberized ply.

During the building of the green tyre, the presence is detected of an excessive concentration of air bubbles in the zone of the building joint of the carcass plies. The parameter given by the concentration of air bubbles at the ply building joint is such to fall within the discard level S since it is greater than the discard threshold Ss (see for example the quality index illustrated in FIG. 4).

Preferably the selection and/or the control of the parameter given by the concentration of air bubbles of the plies is operated considering the quality index I assigned to the date of the elastomeric material for rubberized ply and/or the quality index I assigned to the concentration of air bubbles in the rubberized ply.

Since at least one of the considered parameters was assigned a quality index corresponding to the discard level, the relative tyre being processed, i.e. the green tyre is discarded.

The parameter given by the concentration of air bubbles both of the rubberized ply and of the relative green tyre is for example read by means of detecting devices. Preferably the detecting devices are associated with a system for managing the steps for manufacturing the semi-finished product or the steps for building the green tyre, to which the parameter under examination is associated.

At least the control result of the parameter given by the concentration of air bubbles of the ply is feedbacked in order to verify the quality index I of the considered parameters. In particular at least one of the considered parameters is modified by the feedback so as to be assigned a quality index I corresponding to the acceptable level A at the subsequent control. In the example in question, the feedback of the control result of the parameter given by the concentration of air bubbles in the green tyre, in particular at the ply building joint, modifies the quality index I of the three considered parameters.

In the examples 1-5 of FIG. 1, the method according to the invention provides for subjecting the moulded and cured tyre to a control, e.g. an automatic visual control (or CVA), and feedbacking the results of the automatic visual control relative at least to the parameters considered for verifying the quality index I thereof. Preferably the automatic visual control operates as a function of the quality indices I assigned to the considered parameters.

With reference to example 1, one of the parameters is given by the width of the tread band. Such parameter is subjected to reading by means of detecting devices, e.g. a linear telecamera that reads the width of the tread band during the obtainment thereof. FIG. 6 corresponds to such reading, for example carried out with a frequency of one measurement per second. The abscissas of the diagram of FIG. 6 correspond with the length l of the tread band and the ordinates correspond with the width L of the tread band read at a specific length l thereof. Reference numbers were not indicated since FIG. 6 qualitatively represents a reading carried out on the width L of the tread band. Comparison is made with a discard threshold Ss and a reserve threshold Sr, for example the value of the reading indicated with 1 in FIG. 6. Such value 1 is assigned a quality index corresponding to the acceptable level with reserve AR. In particular, the underlined reading is less than the lower reserve threshold Sr but still within the acceptable interval A, i.e. greater than the lower discard threshold Ss.

According to one possible embodiment of example 1, the control of the parameter given by the width of the tread band is carried out at the level of a control unit for a system for managing the relative semi-finished product to which the parameter is associated. The relative quality index I assigned to the parameter following the control can be sent to a control unit for the automatic visual control operating on the moulded and cured tyre.

Other parameters taken under consideration in example 1 are assigned an index of acceptable quality A.

At the automatic visual control level, a parameter is detected relative to the quality of the finished product, in particular a parameter relative to the presence and size of specific detects, such as the insufficient buttress. From the assigning of the quality index I to such parameter, it emerges that the moulded and cured tyre is to be discarded.

Preferably the parameter given by the width of the tread band constitutes an initial parameter and the verification carried out by the automatic visual control can be performed on one or more specific parameters (presence and size of specific defects) constituting further parameters since:
- their selection is operated considering the quality index assigned to the initial parameter; and/or
- their control is operated considering the quality index assigned to the initial parameter.

The control result carried out by the automatic visual control is feedbacked in order to verify the quality indices I of the parameters taken under consideration and in particular for modifying the quality index I relative to the width of the tread band in a manner so as to result corresponding to the acceptable level A.

With reference to example 2, different parameters are detected, to which a quality index acceptable with reserve AR is assigned. In particular a quality index acceptable with reserve AR is assigned to:
a) the parameter given by the date of use of the elastomeric material prepared for the sidewalls;
b) the parameter given by the concentration and by the size of air bubbles in the sidewalls;
c) the parameter given by the concentration and by the size of air bubbles in the green tyre.

The automatic visual control receives the quality indices (or it receives the values of the various parameters and it carries out the control thereof for the assigning of the relative quality index I).

At the automatic visual control level, a parameter is detected relative to the quality of the finished product in particular a parameter relative to the presence and size of specific defects, such as the concentration and size of air bubbles in the sidewalls. From the assigning of the quality index I to such parameter, it emerges that the moulded and cured tyre is to be discarded.

Preferably the parameter pursuant to letter a) constitutes an initial parameter for the subsequent parameter pursuant to letter b) since:
- the selection of the parameter pursuant to letter b) is operated considering the quality index I assigned to the initial parameter; and/or
- the control of the parameter pursuant to letter b) is operated considering the quality index I assigned to the initial parameter.

That stated above can be applied with reference to the ratio between the parameter pursuant to letter b) and the parameter pursuant to letter c) and to the ratio between one or more of the parameters pursuant to letters a)-c) and the parameter given by the concentration and the size of air bubbles in the sidewalls of the moulded and cured tyre.

The control result carried out by the automatic visual control is feedbacked in order to verify the quality indices I of the parameters taken under consideration. In particular at least one of the considered parameters is modified by the feedback so as to be assigned a quality index I corresponding to the acceptable level A at the subsequent control. In the example in question, the feedback of the control result of the parameter given by the concentration and size of air bubbles in the sidewalls modifies the quality index I of the considered parameters.

With reference to example 3, a parameter relative to the curing is assigned a quality index corresponding to an acceptable level with reserve AR. Such parameter can be given by the number of cycles or by the integrity of the chamber. The other parameters, if detected, are assigned a quality index corresponding to an acceptable level A.

The automatic visual control receives the various quality indices (or it receives the values of the various parameters and it carries out the control thereof for assigning the relative quality index I).

At the automatic visual control level, a parameter is detected relative to the quality of the finished product, in particular a parameter relative to the presence and size of specific defects, such as the presence of defects relative to the curing. From the assigning of the quality index I to such parameter, it emerges that the moulded and cured tyre is to be discarded.

Preferably the parameter given by the number of cycles and/or by the integrity of the curing chamber constitutes an initial parameter for the subsequent parameter taken under consideration by the automatic visual control (defects due to the curing) since:
- the selection of the parameter given by the presence of defects due to the curing is operated considering the quality index I assigned to the initial parameter; and/or
- the control of the parameter given by the presence of defects due to the curing is operated considering the quality index I assigned to the initial parameter.

The control result carried out by the automatic visual control is feedbacked in order to verify the quality indices I of the parameters taken under consideration. In particular at least one of the considered parameters is modified by the feedback so as to be assigned a quality index I corresponding to the acceptable level A at the subsequent control. In the example in question, the feedback of the control result of the parameter given by the presence of defects due to the curing modifies the quality index I of the considered parameters.

With reference to example 4, the situation is analogous to the example 3 with the difference that from the assigning of the quality index of the parameter relative to the quality of the finished product, in particular of the parameter relative to the presence and size of specific defects, such as the presence of defects relative to the curing, it emerges that the moulded and cured tyre is acceptable with reserve AR.

The result of the automatic visual control is feedbacked in order to verify the quality indices of the parameters taken under consideration. In this case, the quality indices of the considered parameters are not modified.

With reference to example 5, a parameter relative to the date of use of an initial component is assigned a quality index corresponding to an acceptable level with reserve AR. The other parameters, if detected, are assigned a quality index corresponding to an acceptable level A.

The automatic visual control receives the various quality indices (or it receives the values of the various parameters and it carries out the control thereof for assigning the relative quality index).

At the automatic visual control level, a parameter relative to the quality of the finished product is detected, in particular a parameter relative to the presence and size of specific defects, such as the concentration and the size of air bubbles in the portion of the tyre affected by the initial component.

From the assigning of the quality index to such parameter, it emerges that the quality index of the moulded and cured tyre corresponds to an acceptable level A.

The control result carried out by the automatic visual control is feedbacked in order to verify the quality indices of the parameters taken under consideration. In this case, the quality indices of the considered parameters are not modified.

The above-described examples are actuated in a plant 2 for building tyres. One example of such plant is illustrated in FIGS. 7 and 8 and comprises:

a system for managing initial components 3;

a system for managing the manufacturing of semi-finished products 4 starting from one or more initial components;

a system for managing the building of a green tyre 5 starting from one or more semi-finished products;

a system for managing the curing 6 of the green tyre.

Each management system 3-6 can comprise and manage one or more stations, for example for manufacturing semi-finished products or for building the green tyre.

In accordance with one possible embodiment, the plant 2 comprises at least one automatic visual control system (CVA) 7 operating on the moulded and cured tyre.

Preferably the automatic visual control operates on the moulded and cured tyre as a function of the quality indices I assigned to the two parameters.

The plant 2 further comprises a control unit.

In accordance with one possible embodiment, the plant 2 comprises a control unit 8 (FIG. 8) placed to manage the plant itself. Possibly the control unit 8 is assisted by and operatively connected with one or more control units 8a-8d for the above-described management systems 3-6. Possibly the control unit 8 is assisted by and operatively connected with a control unit 8e for the automatic visual control system 7. In this case, the control unit is the logical set of the control unit 8 and of one or more of the respective control units 8a-8e for the management systems 3-6 described above, possibly also comprising the automatic visual control system 7.

In accordance with one possible embodiment, the plant 2 comprises a control unit 8e placed to manage the automatic visual control system 7 (FIG. 7) possibly assisted by and operatively connected with respective control units 8a-8d for the management systems 3-6 described above. In this case, the control unit is the logical set of the control unit 8e for the automatic visual control system 7 and of one or more of the respective control units 8a-8d for the management systems 3-6 described above.

In accordance with one possible embodiment, not illustrated, the control unit is the logical set of one or more of the control units 8a-8d for the management systems 3-6 described above and possibly of the control unit 8e for the automatic visual control system 7.

One or more of the above-described control units 8, 8a-8e can be programmed for detecting or receiving at least one parameter P. Possibly one or more of the above-described control units 8, 8a-8e is programmed for controlling such detected or received parameter P, assigning a quality index I thereto. In particular the control of at least one parameter P can be carried out at the level of one or more from among:

the control unit 8 for the plant 2;

the control unit 8a-8d for a system 3-6 for managing the initial component(s), steps for manufacturing the semi-finished products, steps for building the green tyre, curing. Preferably the control of at least one parameter P can be carried out at the level of the control unit 8a-8d for the management system 3-6 to which the parameter is associated;

the control unit 8e for the automatic visual control system 7.

In addition or alternatively, one or more of the above-described control units 8, 8a-8e can be programmed for receiving at least one quality index I of at least one parameter P. In this case, the control of the parameter P with assigning of the quality index I is carried out by one from among:

the control unit 8 for the plant 2;

the control unit 8a-8d for the management system 3-6;

the control unit 8e for the automatic visual control system 7, different from that which receives the quality index I of the parameter P (i.e. the control result on the parameter P).

Considering as control unit the logical set of one or more of the control units 8a-8d for the management systems 3-6 described above and/or of the control unit 8e for the automatic visual control system 8 and/or the control unit 8 for the plant 2, such control unit is programmed for controlling at least two parameters relative to a tyre being processed according to that described with reference to the examples of the above-reported method.

In addition, the control unit thus defined is programmed for feedbacking the control result of at least one parameter in order to verify the quality index I of the at least two parameters. In the presence of an automatic visual control system (CVA) 7, the control unit can be programmed for feedbacking the results of the automatic visual control relative at least to the at least two parameters for verifying the quality index I thereof.

In accordance with one possible embodiment, the control unit can be programmed for controlling an initial parameter and one further parameter. According to one possible embodiment, the control of the further parameter is carried out considering the quality index I assigned to the initial parameter. In addition and/or alternatively, the control unit is programmed for controlling the initial parameter, assigning a relative quality index I thereto, and for selecting the further parameter to be detected as a function of the quality index I assigned to the initial parameter. In both cases, the control unit is further programmed for feedbacking the control result at least of the further parameter in order to verify the quality index I of the initial parameter and of the further parameter.

In the case of an initial parameter and a further parameter, as defined above, one or more from among:

the control unit 8 for the plant 2;

the control unit 8a-8d for a management system 3-6;

the control unit 8e for the automatic visual control system 7;

can detect or receive at least the initial parameter or the quality index at least of the initial parameter. Such initial parameter or such quality index of the initial parameter can come from a management system 3-6 to which the initial parameter is associated or from a different control unit from among the control units 8, 8a-8e provided in the plant.

Preferably the control unit that has received the initial parameter or the quality index at least of the initial parameter carries out the control or receives the control results of at least one further parameter with assigning of the relative quality index and sends—to the system for managing the initial component(s), steps for manufacturing the semi-finished product, steps for building the green tyre, curing to which the initial parameter is associated—instructions for modifying the quality index of the initial parameter as a function of the quality index of the further parameter.

The further parameter can be associated with the moulded and cured tyre (see examples 1-5) or with the green tyre prior to the curing (see example 6).

According to one possible embodiment, the plant comprises a communication network 9 interconnected between one or more of the management systems 3-6 (in particular the respective control units 8a-8d) and/or the control unit 8 for the plant and/or the control unit 8e for the automatic visual control system 7. Such communication network allows managing, within the control unit, at least one of the parameters P and/or the quality index I of at least one of the parameters P. The management of at least one of the parameters P and/or of the quality index I of at least one of the parameters can comprise the detection and the control of parameters, the sending and reception of parameters and/or of quality indices.

The plant 2 can comprise detecting devices 10 adapted for detecting at least one of the considered parameters. In this case, the detection of at least one parameter is carried out by reading such parameter by means of at least one detecting device 10. Preferably one or more of the management systems 3-6 are associated with relative detecting devices 10 preferably operatively connected to the respective control unit 8a-8d. In the case of automatic visual control system 7, the relative parameter(s) is detected by the automatic visual control itself which represents a detecting device operatively connected to the relative control unit 8e.

The reading of at least one of the parameters P carried out by means of detecting devices 10 can be sent to one or more from among:
 a control unit 8 for the plant;
 a control unit 8a-8d for a system 3-6 for managing the initial components, steps for manufacturing the semi-finished products, steps for building the green tyre, curing. Preferably the reading of at least one of the parameters P carried out by means of detecting devices 10 is sent:
  to the control unit 8a-8d for the management system 3-6 to which such parameter is associated;
  to a control unit 8e for an automatic visual control 7 operating on the moulded and cured tyre.

In addition or alternatively, the plant 2 can comprise interface devices 11 for entering at least one of the considered parameters. The interface devices 11 can be provided at the above-described management systems 3-6 (in particular at respective control unit 8a-8d for each management system) and/or at the control unit 8 for the plant and/or at the control unit 8e for the automatic visual control system 7. Using the interface devices 11, the detection of at least one of the considered parameters can occur by entering such parameter by means of one of the interface devices 11 of the plant.

The interface devices 11 can also be used for entering one or more discard thresholds Ss and/or reserve thresholds Sr for one or more quality indices I.

Generally, it is therefore possible that the detection of at least one of the parameters P occurs by entering such parameter in one or more from among:
 a control unit 8 for the plant 2;
 a control unit 8a-8d for a system 3-6 for managing the initial component(s), steps for manufacturing the semi-finished products, steps for building the green tyre, curing. Preferably the detection of at least one of the parameters P occurs by entering such parameter:
  in the control unit 8a-8d for the management system 3-6 to which such parameter is associated;
  into a control unit 8e for an automatic visual control 7 operating on the moulded and cured tyre.

Below, an example of application of the method according to the invention is described with reference to the plant of FIG. 8 and to the example 2.

The system for managing the initial components 3 detects the parameter given by the date of use of the elastomeric material prepared for the sidewalls. The relative control unit 8a performs the control thereof, assigning to such parameter a quality index I corresponding to the acceptable level with reserve AR. The quality index I of the parameter given by the date of use of the elastomeric material prepared for the sidewalls can be sent to the control unit 8.

The system for managing the steps for manufacturing the semi-finished products, detects the parameter given by the concentration and by the size of air bubbles in the sidewalls. The relative control unit 8b performs the control thereof, assigning to such parameter a quality index I corresponding to an acceptable level with reserve AR. The quality index I of the parameter given by the concentration and by the size of air bubbles in the sidewalls can be sent to the control unit 8.

The system for managing the steps for building the green tyre detects the parameter given by the concentration and by the size of air bubbles in the green tyre. The relative control unit 8c performs the control thereof, assigning to such parameter a quality index I corresponding to an acceptable level with reserve AR. The quality index I of the parameter given by the concentration and by the size of air bubbles in the green tyre can be sent to the control unit 8.

At the automatic visual control system 7 level, a parameter is detected relative to the quality of the finished product, in particular a parameter relative to the presence and size of specific defects, such as the concentration and the size of air bubbles in the sidewalls. The relative control unit 8e performs the control thereof, assigning to such parameter a quality index I corresponding to a discard level S. The quality index I of the parameter given by the concentration and by the size of air bubbles in the sidewalls in the moulded and cured tyre can be sent to the control unit 8.

The control unit 8 feedbacks the control result carried out by the automatic visual control in order to verify the quality indices I of the parameters taken under consideration. In particular at least one of the considered parameters is modified by the feedback so as to be assigned a quality index I corresponding to the acceptable level A at the subsequent control. In the example in question, the feedback of the control result of the parameter given by the concentration and by the size of air bubbles in the sidewalls modifies the quality index I of the considered parameters.

Alternatively, the control unit 8 can receive one or more parameters P for carrying out the control thereof.

An analogous example of application of the method according to the invention, with reference to the plant of FIG. 7 and to the example 2, differs from that stated above due to the fact that the control unit 8e for the automatic visual control system substitutes the control unit 8 for the plant 2.

Analogous to the plant of FIG. 7 or 8, the further examples 1 and 3-7 described above can be applied.

The plant 2 can further comprise one or more discard lines 12 selected from among:
 a discard line for discarding the initial component whose parameter was assigned with a quality index I corresponding to the discard level S;

a discard line for discarding the semi-finished product whose parameter was assigned with a quality index I corresponding to the discard level S;

a discard line for discarding the built green tyre whose parameter was assigned with a quality index I corresponding to the discard level S;

a discard line for discarding the moulded and cured tyre whose parameter was assigned with a quality index I corresponding to the discard level S.

Possibly, the plant can provide for one or more from among:

at least one instrumental control system 13;

a manual visual control system 14.

One or more of such systems is preferably disposed downstream of the automatic visual control, if present. One or more of such systems is operating on the moulded and cured tyre. Corresponding lines of discard 12 can be provided for the instrumental control system 13 and/or for the manual visual control system 14.

The invention claimed is:

1. A method for building a tyre comprising:
processing structural elements comprising initial components and semi-finished products into a moulded and cured tyre, comprising:
(a) introducing said initial components into a tyre manufacturing operation;
(b) manufacturing said semi-finished products starting from one or more of said initial components;
(c) building a green tyre starting from one or more of said semi-finished products; and
(d) moulding and curing said green tyre in a chamber;
wherein said processing includes:
detecting an initial parameter relative to said moulding and curing step, said initial parameter is a number of cycles in the chamber or an integrity of the chamber;
determining a numerical value of the initial parameter;
assigning to said initial parameter a quality index corresponding to one of a discard level, an acceptable level, and an acceptable level with reserve, the assignment comprising comparing said numerical value of the initial parameter with a discard threshold and a reserve threshold for the initial parameter, wherein said discard threshold for the initial parameter separates the discard level from the acceptable level and wherein said reserve threshold for the initial parameter corresponds to the acceptable level and defines one or more acceptable levels with reserve proximal to the discard threshold;
at said processing step d), wherein the quality index of the initial parameter corresponds to an acceptable level with reserve, detecting a further parameter relative to a moulded and cured tyre, said further parameter is a presence of a defect or a size of the defect of the moulded and cured tyre, determining a further numerical value of the further parameter and assigning a subsequent quality index to said further parameter, said subsequent quality index being assigned by comparing said further numerical value of the further parameter with a discard threshold and a reserve threshold for the further parameter, wherein said discard threshold for the further parameter separates a discard level from an acceptable level for the further parameter and wherein said reserve threshold for the further parameter corresponds to the acceptable level for the further parameter and defines one or more acceptable levels with reserve for the further parameter proximal to the discard threshold for the further parameter;
discarding said moulded and cured tyre when said subsequent quality index corresponding to said discard level is assigned to said further parameter;
feedbacking from the processing step d) the assignment of said subsequent quality index in order to verify the quality index of said initial parameter and the subsequent quality index of said further parameter; and
modifying at least one of the quality index of said initial parameter and the subsequent quality index of said further parameter by said feedbacking so as to be assigned with the quality index corresponding to said acceptable level at a subsequent control.

2. The method for building a tyre as claimed in claim 1, wherein the quality index of said initial parameter is modified by said feedbacking so as to correspond to said acceptable level at the subsequent control.

3. The method for building a tyre as claimed in claim 1, comprising:
subjecting said moulded and cured tyre to an automatic visual control; and
feedbacking the results of the automatic visual control relative to at least one of said initial parameter and said further parameter in order to modify both the quality index of said initial parameter and subsequent quality index of said further parameter.

4. The method for building a tyre as claimed in claim 3, wherein said automatic visual control operates as a function of at least the quality index assigned to at least one of said initial parameter and said further parameter.

5. The method for building a tyre as claimed in claim 1, comprising subjecting said moulded and cured tyre to at least one instrumental control.

6. The method for building a tyre as claimed in claim 1, comprising subjecting said moulded and cured tyre to at least one manual visual control.

7. The method for building a tyre as claimed in claim 1, wherein detecting at least one of said initial parameter and further parameter comprises reading at least one of said initial parameter and further parameter with detecting devices.

8. The method for building a tyre as claimed in claim 1, wherein detecting said initial parameter comprises entering said initial parameter into a control unit.

9. The method for building a tyre as claimed in claim 1, wherein one of said quality index of the initial parameter and said subsequent quality index of the further parameter corresponds to an upper discard level separated from said acceptable level by means of an upper discard threshold.

10. The method for building a tyre as claimed in claim 1, wherein one of said quality index of the initial parameter and said subsequent quality index of the further parameter corresponds to an upper acceptable level with reserve proximal to an upper discard threshold and defined within the acceptable level by means of an upper reserve threshold.

11. The method for building a tyre as claimed in claim 1, wherein one of said quality index of the initial parameter and said subsequent quality index of the further parameter corresponds to an acceptable level with reserve adjacent to a second acceptable level with reserve.

12. The method for building a tyre as claimed in claim 1, wherein the initial parameter is a number of cycles.

13. The method for building a tyre as claimed in claim 1, wherein said processing further includes:
selecting the further parameter for detection in response to assigning an acceptable level with reserve to the quality index of the initial parameter.

* * * * *